United States Patent [19]

Kadin

[11] Patent Number: 4,612,652
[45] Date of Patent: Sep. 16, 1986

[54] FREQUENCY HOPPING DATA COMMUNICATION SYSTEM

[75] Inventor: Joseph Kadin, Florham Park, N.J.

[73] Assignee: ITT Corporation, New York, N.Y.

[21] Appl. No.: 662,924

[22] Filed: Oct. 19, 1984

[51] Int. Cl.[4] .................. H04L 25/26; H04B 15/00
[52] U.S. Cl. .................................... 375/1; 375/51; 375/58; 375/62; 375/89
[58] Field of Search .............. 375/1, 2.1, 40, 48, 375/54, 58, 62, 89, 115, 45, 51; 364/717; 331/78; 367/39; 343/5 PN; 455/27, 29; 178/22.01; 370/18, 19, 21, 107

[56] References Cited

U.S. PATENT DOCUMENTS

| | | | |
|---|---|---|---|
| 4,037,159 | 7/1977 | Martin | 375/58 |
| 4,041,391 | 8/1977 | Deerkoski | 375/54 |
| 4,142,240 | 2/1979 | Ward et al. | 364/717 |
| 4,164,628 | 8/1979 | Ward et al. | 370/19 X |
| 4,231,113 | 10/1980 | Blasbalg | 455/29 |
| 4,435,821 | 3/1984 | Ito et al. | 375/1 |

*Primary Examiner*—Benedict V. Safourek
*Attorney, Agent, or Firm*—John T. O'Halloran; Jeffrey P. Morris

[57] ABSTRACT

An improved frequency hopped data communication system with a random transmission of mark and space frequency over the transmission bandwidth to provide independent frequency hopping of the mark and space frequency is provided in the system which is particularly immune to repeater jamming. Only one frequency is transmitted at a time upon selection on a bit instant by a pseudo-noise code generator. The location of the mark and space frequency is randomly chosen, however, the location is known at the transmitter and the repeater by appropriate synchronization equipment.

14 Claims, 5 Drawing Figures

FREQUENCY HOPPING DATA COMMUNICATION SYSTEM

BACKGROUND OF THE INVENTION

The present invention relates to data communication systems and more particularly to an improved frequency hopping data communication system.

Spread spectrum communication systems have been used in a varity of fields. In the communication system of this type, the transmitted bandwidth is much greater than the bandwidth or rate of the information to be transmitted. The carrier wave is modulated by some function to widen or spread the bandwidth for transmission. The received signal is remapped into the original information bandwidth to reproduce a desired signal. The spread spectrum communication system has many useful advantages: a selective call is possible; since the power spectrum density is low, private communication is allowed; and it is little influenced by interference either due to multipath fading or jamming. From this standpoint, the spread spectrum system has found many uses, such as mobile communication systems, avionics systems, satellite communicaton systems, scatter communication systems of both the ionospheric and tropospheric type, direction finders and distance measuring equipment.

The spread spectrum systems can be catagorized into a direct sequence system, a frequency hopping system, a time hopping system and a hybrid system which is a proper combination of the systems just mentioned. Of these communication systems, the frequency hopping system is frequently used in the field of mobile communication systems with a low traffic volume for a number of stations. Also, frequency hopping systems can be employed in satellite communication systems and scatter communication systems where a fading environment is present.

In the frequency hopping system a carrier frequency is shifted or jumped in discreet increments in a pattern dictated by prepare code sequences (e.g. a pseudo-noise code, M-sequence codes, Gold codes and the like) in synchronism with a change in state of the codes. The resulting consecutive and time sequential frequency pattern is called a hopping pattern and the duration of each hopping frequency is called a chip. The transmitted information is embedded in the codes or embedded in each frequency of the carrier wave by a so-called FSK (frequency shift keying) modulation. The information signal thus spread-spectrum-modulated is reproduced at a receiver.

In reproducing the information signal by the receiver, a synchronization acquisition process is first performed, in which the code pattern produced in the receiver is made accurately coincident with the code pattern generated in the transmitter in time position. Then, the spread spectrum signal is despread, and thereafter a well known demodulation is performed to extract the desired information. More particularly, a local reference signal of a frequency correspondingly determined by the same code pattern as that in the transmitter for every chip and the received signals are mixed in a mixer in order to perform a correlation (despreading) process for converting the spread spectrum signal into the signal having a frequency bandwidth wide enough to extract the information. This system is described in detail in "Spread Spectrum Systems" by R. C. Dixon, published by John Wiley & Sons Inc. in 1976. Following this despreading process, the desired information is extracted by the usual demodulation technique.

Such a system is not only useful in obtaining a proper coherent transmission in a fading environment, such as is present in mobile communications, satellite communications and scatter communications, the system is also jammer resistant.

A prior art receiver for a frequency hopping communication system is also fully described in U.S. Pat. No. 4,435,821.

SUMMARY OF THE INVENTION

An object of the present invention is to provide an improved frequency hopping data communication system that is protected against jamming and in particular is immune to repeater jamming.

Another object of the present invention is to provide a frequency hopping data communication system which is not only immune to repeater jamming but which will also operate in a fading environment.

A feature of the present invention is the provision of a frequency hopping data communication system comprising first means responsive to a first clock signal having a predetermined bit rate to produce identical first and second pseudo-noise code streams time displaced with respect to each other; second means coupled to the first means, the second means being responsive to binary data signals having the predetermined bit rate and the first and second code streams to provide a modulated signal for conveying the data signals, the modulated signal having different randomly occurring frequencies representing both binary conditions of the data signals and random spacing between the randomly occurring frequencies representing each of the binary conditions of the data signals; third means coupled to the second means to receive the modulated signal and to separate the randomly occurring frequencies representing each of the binary conditions from the received modulated signal; fourth means coupled to the third means to recover the data signals from the separated, received modulated signals; and fifth means coupled to the third means and the fourth means to synchronize the third means to the received modulated signal.

Another feature of the present invention is the provision of a frequency hopping data transmitter comprising first means responsive to a clock signal having a predetermined bit rate to produce identical first and second pseudo-noise code streams time displaced with respect to each other; and second means coupled to the first means, the second means being responsive to binary data signals having the predetermined bit rate and the first and second code streams to provide a modulated signal for conveying the data signals, the modulted signal having different randomly occurring frequencies representing both binary conditions of the data signals and random spacing between the randomly occurring frequencies representing eacn of the binary conditions of the data signals.

Still a further feature of the present invention is the provision of a frequency hopping data communication receiver comprising first means to receive a transmitted signal conveying binary data signals having a predetermined bit rate by means of different randomly occurring frequencies representing both binary conditions of the data signals with the randomly occurring frequencies representing each of the binary conditions having a random spacing therebetween; second means coupled to the first means to separate the randomly occurring frequencies representing each of the binary conditions from the received transmitted signal; third means coupled to the second means to recover the data signals from the separated, received transmitted signals; and fourth means coupled to the second means and the third means to synchronize the second means to the received transmitted signal.

DESCRIPTION OF THE DRAWING

The above-mentioned and other objects and features of the present invention and a manner of obtaining them will become more apparent by reference to the following description taken in conjunction with the drawing, in which.

DESCRIPTION OF THE PREFERRED EMBODIMENT

The major problem experienced to date in high frequency systems and high frequency slow hopping systems are that they can be jammed by repeater jammers. Hopping at slow speed was considered necessary due to the dispensive characteristics of the high frequency environment. The advantage against repeater jammers in a fast hopping system is mitigated by the fact that the time delay of the hopped signal can vary up to approximately 5 milliseconds. As such, the receiver would of necessity stay open for periods of time longer than the transmitted hopped interval. The repeater jammer would received our signal, smear it with noise and retransmit the signal in plenty of time to enter our receiver time window to jam our signal. The effects are particularly strong against digital signals requiring low bit error rates.

Figure 1:
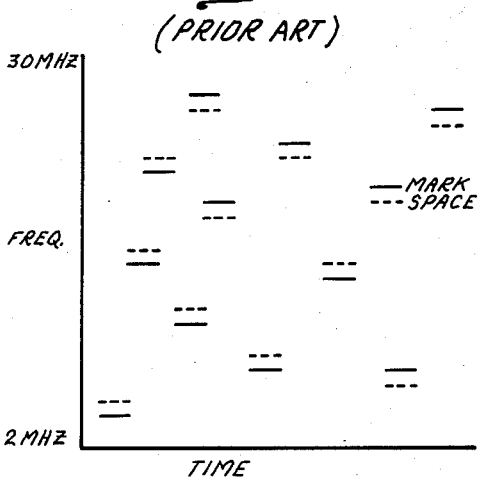
FIGS. 1 and 2 illustrate respectively a frequency versus time diagram and a receiver filter response diagram of prior art FSK systems.
Figure 2:
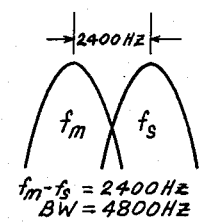

The effectiveness of the frequency hopping data communication system of the present invention can best be described by comparing the instant system to the standard FSK system. A standard FSK system will have a mark and space filter symmetrically located around the carrier frequency within the receiver bandwidth (i.e., 2400 hertz) as illustrated in FIG. 2 with this precise constant spacing between the mark frequency and the space frequency being present regardles of how the signal is hopped as illustrated in FIG. 1. As such, the prior art system can be jammed by the repeater jammer. The jammer simply receives one of our signals and retransmits it smeared with noise across both mark and space filters.

Figure 3:
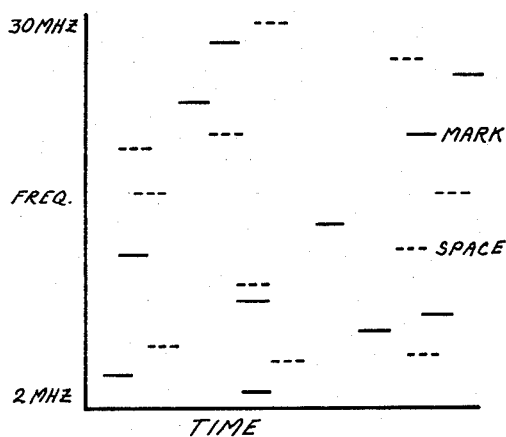
FIGS. 3 and 4 illustrate respectively a frequency versus time diagram and the FSK waveforms for a frequency hopping data communication system in accordance with the principles of the present invention.
Figure 4:
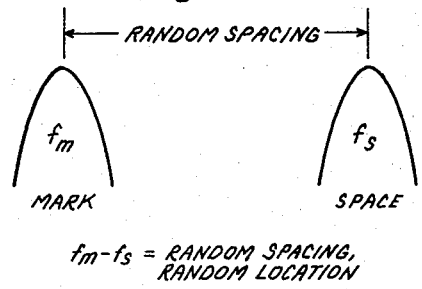

In the system of the present application only one frequency is transmitted at a time (the frequency selected on a bit instant by the code generators). The location of the mark and space frequencies will be randomly chosen over the whole bandwidth. Their location will be known at both ends of the link by the synchronized code generators. This arrangement is shown in FIGS. 3 and 4. If in the receiver we agree with the mark frequency, we know that a mark was sent and vice versa with the space frequency. At one instant then the frequency spacing could be as much as 28 megahertz or as little as 1200 hertz. The spacing between the mark and space frequencies will vary at a random rate as determined by code generators. Jammers, upon receiving this signal and attempting to jam our system by smearing or adding additional energy, will only add additional power to our received signal helping our detection process. The jammer cannot confuse our system by making the mark look like a space and vice versa, since he does not know the other frequency not having our complex, non-linear code generators set to the exact same timing and key variable.

Figure 5:
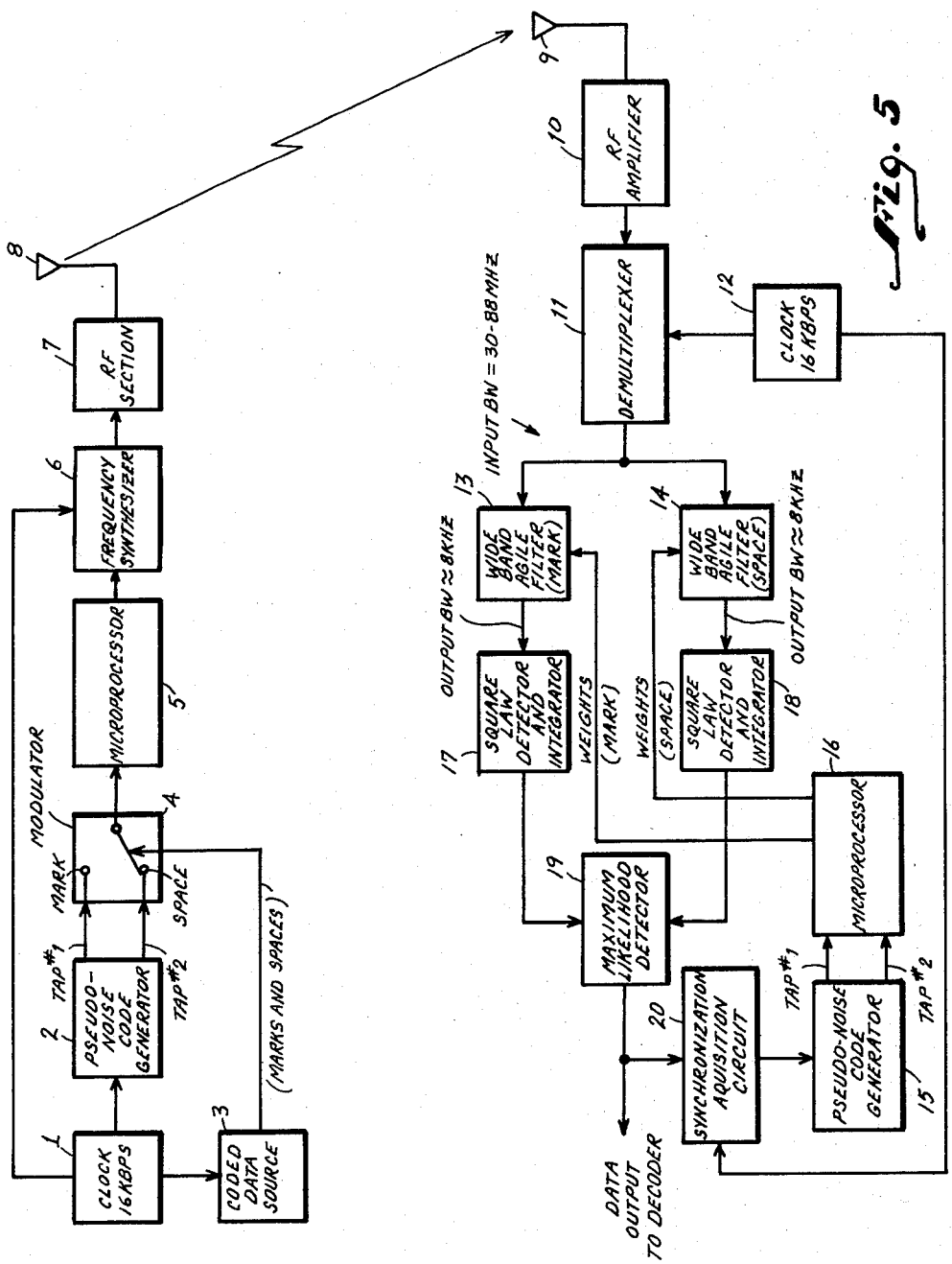
FIG. 5 is a block diagram of a frequency hopping data communication system in accordance with the principles of the present invention.

Referring to FIG. 5, the frequency hopping data communication system in accordance with the principles of the present invention is illustrated in block diagram form. The system uses a coded FSK waveform which is essentially immune to repeater jamming and which enhances the communication process in a fading environment, such as in mobile, scatter and satellite communication systems. The hopping rate for the system is at the data or symbol transmission rate. The transmitted frequency is randomly hopped using a dual tap pseudo-noise code generator to determine frequency. The modulation is essentially binary FSK. The unique feature is that the transmitted frequency and the frequency spacing for the FSK modulation is a random function of time controlled by the pseudo-noise code generator. The receiver guards two frequencies (a mark frequency and a space frequency) in a manner which renders the communication system immune to repeater jamming and which enhances the communication process in a fading environment. One bit of information is sent at each hop. As such, a potential repeater jammer by receiving and repeating our signal, for instance, a mark frequency, can only reinforce our transmission. The location of the second frequency (the space frequency) is not known to the jammer due to the use of the pseudo-noise generator.

A clock 1 operating, for instance, at 16 kilobits per second (KBPS) controls a pseudo-noise code generator 2 so that it has the rate of the data source 3. The data source 3 can be any source including voice which has been converted to a binary signal in the form of marks and spaces. Such an encoder could be a CVSD coder (continuously variable slope delta) encoder. The code generator 2 may be in the form of a known shift register arrangement having two taps therealong identified as tap #1 and tap #2 in FIG. 5. Such a code generator is disclosed in U.S. Pat. No. 4,142,240, issued Feb. 27, 1979 to C. R. Ward and R. A. Reilly, assigned to the same assignee as the instant application, whose disclosure is incorporated herein by reference. Code generator 2 will produce two identical pseudo-noise code steams time displaced with respect to each other. One of these pseudo-noise code streams would represent a mark and the second pseudo-noise code stream would represent a space. These two code streams are coupled to a modulator 4, which may be a switching modulator provided by, for instance, a transistor switching circuit under control of the marks and spaces forming the coded data source 3. The switching circuit of modulator 4 would be controlled such that the mark code stream would be passed when a mark is present and the space code stream would be passed when a space is present. A particular code stream passed by the switching circuit of modulator 4 would be coupled to a microprocessor 5 having stored therein a table of values representing the various different random hopping frequencies and thereby determines the frequency generated by frequency synthesizer 6. Synthesizer 6 is also is also controlled by clock 1 to produce or pass a particular frequency signal which is hopped at the data rate. The hopped frequencies at the output of synthesizer 6 are coupled to the RF section 7 and, hence, to antenna 8 for transmission to the receiving antenna 9 at the opposite end of the communication system.

A received frequency hopped signal received at antenna 9 is coupled to RF amplifier 10 and, hence, to a demultiplexer 11 operating under control of clock 12 operating at the same frequency as clock 1 (16KBPS in the example employed) to separate the mark frequencies and space frequencies from the received modulated or transmitted signal containing both the mark and space frequencies. The separated mark frequencies are coupled to wide band agile filter 13 and the separated space frequencies are coupled to wide band agile filter 14. Filters 13 and 14 may be transversal filters of the type disclosed in U.S. Pat. No. 4,164,628, issued Aug. 14, 1979 to C. R. Ward and R. A. Reilly, assigned to the same assignee as the instant application, whose disclosure is incorporated herein by reference. Filters 13 and 14 are under control of pseudo-noise code generator 15 which produces third and fourth pseudo-noise code streams identical with the first and second pseudo-noise code streams produced by code generator 2 in tne tramsitter. Generator 15 may be the type disclosed in the above-cited U.S. Pat. No. 4,142,240. The third and fourth data code streams control microprocessor 16 which has a table of weight values which control the frequencies passed by the filters 13 and 14 in step with the frequencies passed by agile filter 6 of the transmitter. The signals passed by filters 13 and 14 are each coupled to a different square law detector and integrater 17 and 18, respectively. The purpose of square law detector and integrater 17 and 18 is to provide an output only in response to the frequencies received at antenna 9 which were transmitted from antenna 8 to enable maximum likelihood detector 19 to discriminate against the desired frequencies and the frequencies received from a jammer or to enable enhancement of the signals transmitted in a fading environment.

Detector 19 could be a threshold detector having two spaced amplitude threshold levels. Any signal applied thereto below the lower threshold level would be discarded as being noise. Any signal applied thereto above the upper threshold level would be discarded as being a jammer. The threshold detector would pass only those signals that occur non-coincidentially between the two threshold levels. If two signals should appear simultaneously between the two threshold levels, they would be considered jamming signal and would be discarded.

Due to different path lengths and time delay in the propagation of the signal from antenna 8 to antenna 9, the third and fourth pseudo-noise code streams from generator 15 could be out of synchronization with the first and second code streams produced in code generator 2. To ensure proper synchronization, the output of detector 19 is coupled to a sychnronization acquisition circuit 20 which has the output of clock 12 coupled thereto which under synchronization would cause the generator 15 to operate directly from the output of clock 12. When synchronization is not present, the acquisition circuit 20 operates to cause a removal of clock bits until synchronization is achieved. The synchronization acquisition circuit is a well known circuit causing slipping of the clock input to the code generator until the proper output is received from detector 19.

It is quite obvious that to provide two way communication between two terminals the transmitter and receiver just described would be employed to transmit from the far terminal to the near terminal, with the transmitter and receiver illustrated in FIG. 5 being used to transmit from the near terminal to the far terminal.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frequency hopping data communication system having a random location of mark and space frequencies over a transmission bandwidth, comprising:
   first means responsive to a first clock signal having a pedetermined bit rate to produce identical first and second pseudo-noise code streams time displaced with respect to each other;
   second means coupled to said first means, said second means being responsive to binary data signals having said predetermined bit rate and said first and second code streams to provide a modulated signal for conveying said data signals, said modulated signal having different randomly occurring frequencies representing both the binary conditions of said data signals and the random spacing between said randomly occurring frequencies representing each of said binary conditions of said data signals such that mark and space frequencies are frequency hopped independently;
   third means coupled to said second means to receive said modulated signal and to separate said randomly occurring frequencies representing each of said binary conditions from said received modulated signal;
   fourth means coupled to said third means to recover said data signals from said separated, received modulated signals; and
   fifth means coupled to said third means and said fourth means to synchronize said third means to said received modulated signal.

2. A system according to claim 1, wherein said first means includes
   first pseudo-noise code generator having a pair of taps disposed to provide said first and second code streams time displaced with respect to each other.

3. A system according to claim 2, wherein said second means includes
   switching means coupled to said first code generator responsive to said data signals to couple said first code stream to its output upon each occurrence of one of said binary conditions and to couple said second code stream to its output upon each occurrence of the other of said binary conditions,
   a first microprocessor coupled to said output of said switching means, said first microprocessor having a table of values each of which represents a different one of said different random frequencies, said first microprocessor responding to said first and second code streams to sequentially couple predetermined ones of said values to its output, and
   frequency generating means coupled to said output of said first microprocessor responsive to said predetermined ones of said values to provide said different randomly occurring frequencies for both of said binary conditions.

4. A system according to claim 3, wherein said third means includes
   a second pseudo-noise generator having a pair of taps disposed to provide third and fourth pseudo-noise code streams identical with said first and second code streams,
   a second microprocessor coupled to said second code generator, said second microprocessor having said table of values and responding to said third and fourth code streams to couple values representing said randomly occurring frequencies representing said one of said binary conditions to a first output and to couple values representing said randomly occurring frequencies representing said other of said binary conditions to a second output,
   a first frequency responsive means coupled to said second means and said first output of said second microprocessor to separate said randomly occurring frequencies representing said one of said binary conditions from said randomly occurring frequencies representing both of said binary conditions, and
   a second frequency responsive means coupled to said second means and said second output of said second microprocessor to separate said randomly occurring frequencies representing said other of said binary conditions from said randomly occurring frequencies representing both of said binary conditions.

5. A system according to claim 4, wherein said fourth means includes
   a first power measuring and integrating means coupled to said first frequency responsive means to provide a power output signal indicating the power of frequencies passed by said first frequency responsive means,
   a second power measuring and integrating means coupled to said second frequency responsive means to provide a power output signal indicating the power of frequencies passed by said second frequency responsive means, and
   a two amplitude level threshold maximum likelihood detector coupled to said first and second power measuring and integrating means to recover said data signal.

6. A system according to claim 5, wherein said fifth means includes
   synchronization acquisition means coupled to the output of said maximum likelihood detector and said second code generator responsive to a second clock signal having said predetermined bit rate to synchronize said third and fourth code streams with said received modulated signal.

7. A frequency hopping data communication transmitter for transmitting binary data having a random location of mark and space frequencies over a transmission bandwidth, comprising:
   first means responsive to a clock signal having a predetermined bit rate to produce identical first and second pseudo-noise code streams time displaced with respect to each other; and
   second means coupled to said first means, said second means being responsive to binary data signals having said predetermined bit rate and said first and second code streams to provide a modulated signal for conveying said data signals, said modulated signal having different randomly occurring frequenices representing both binary conditions of said data signals and random spacing between said randomly occurring frequencies representing each of said binary conditions of said data signals such that mark and space frequencies are frequency hopped independently.

8. A transmitter according to claim 7, wherein said first means includes
   a pseudo-noise code generator having a pair of taps disposed to provide said first and second code streams time displaced with respect to each other.

9. A transmitter according to claim 8, wherein said second means includes
   switching means coupled to said code generator responsive to said data signals to couple said first code stream to its output upon each occurrence of one of said binary conditions and to couple said second code stream to its output upon each occurrence of the other of said binary conditons,
   a microprocessor coupled to said output of said switching means, said microprocessor having a table of values each of which represents a different one of said different random frequencies, said microprocessor responding to said first and second code streams to sequentially couple predetermined ones of said values to its output, and
   frequency generating means coupled to said output of said microprocessor responsive to said predetermined ones of said values to provide said different randomly occurring frequencies for both of said binary conditions.

10. A transmitter according to claim 7, wherein said second means includes
    switching means coupled to said first means responsive to said data signals to couple said first code stream to its output upon each occurrence of one of said binary conditions and to couple said second code stream to its output upon each occurrence of the other of said binary conditions,
    a microprocessor coupled to said output of said switching means, said microprocessor having a table of values each of which represents a different one of said different random frequenices, said microprocessor responding to said first and second code streams to sequentially couple predetermined ones of said values to its output, and
    frequency generating means coupled to said output of said microprocessor responsive to said predetermined ones of said values to provide said different randomly occurring frequencies for both said binary conditions.

11. A frequency hopping data communication receiver for receiving binary data signals having a random location of mark and space frequencies over a transmission bandwidth, comprising:
    first means to receive a transmitted signal conveying binary data signals having a predetermined bit rate by means of diferent randomly occurring frequencies representing both binary conditions of said data signals with said randomly occurring frequencies representing each of said binary conditions having random spacing therebetween;
    second means coupled to said first means to separate said randomly occurring frequencies representing each of said binary conditions from said received transmitted signal;
    third means coupled to said second means to recover said data signals from said separated, received transmitted signals such that independently frequency hopped mark and space signals are recovered; and fourth means coupled to said second means and said third means to synchronize said second means to said received transmitted signal.

12. A system according to claim 11, wherein said second means includes
- a pseudo-noise code generator having a pair of taps disposed to provide first and second pseudo-noise code streams time displaced with respect to each other,
- a microprocessor coupled to said code generator, said microprocessor having a table of values each of which represents a different one of said different random frequencies, said microprocessor responding to said first and second code streams to couple values representing said randomly occurring frequencies representing said one of said binary condition to a first output and to couple values representing said other of said binary condition to a second output,
- a first frequency responsive means coupled to said first means and said first output of said microprocessor to separate said randomly occurring frequencies representing said one of said binary conditions from said randomly occurring frequencies representing both of said binary conditions, and
- a second frequency responsive means coupled to said first means and said second output of said microprocessor to separate said randomly occurring frequencies representing said other of said binary conditions from said randomly occurring frequencies representing both of said binary conditions.

13. A system according to claim 12, wherein said third means includes
- a first power measuring and integrating means coupled to said first frequency responsive means to provide a power output signal indicating the power of frequencies passed by said first frequency responsive means,
- a second power measuring and integrating means coupled to said second frequency responsive means to provide a power output signal indicating the power of frequencies passed by said second frequency responsive means, and
- a two amplitude level threshold maximum likelihood detector coupled to said first and second power measuring and integrating means to recover said data signals.

14. A system according to claim 13, wherein said fourth means includes
- synchronization acquistion means coupled to the output of said maximum likelihood detector and said code generator responsive to a clock signal having said predetermined bit rate to synchronize said first and second code streams with said received transmitted signal.

* * * * *